United States Patent [19]

Iwamoto et al.

[11] 4,177,913
[45] Dec. 11, 1979

[54] AUTOMATIC PIPE WELDING APPARATUS

[75] Inventors: Taro Iwamoto; Shimon Ando, both of Hitachi, Japan

[73] Assignee: Hitachi, Ltd., Japan

[21] Appl. No.: 877,861

[22] Filed: Feb. 15, 1978

[30] Foreign Application Priority Data

Mar. 1, 1977 [JP] Japan .................................. 52-22339

[51] Int. Cl.² ............................................. B23K 37/02
[52] U.S. Cl. ........................................ 228/9; 228/29; 219/60 A; 219/124.31
[58] Field of Search ........................................ 228/9–11, 228/29, 49 B; 219/60 A, 124.31, 125.11; 81/57.15, 57.18, 57.2

[56] References Cited

U.S. PATENT DOCUMENTS

| 2,376,765 | 5/1945 | Forbes | 228/44.5 |
|---|---|---|---|
| 2,846,909 | 8/1958 | Mason | 81/57.2 X |
| 3,023,651 | 3/1962 | Wallace | 81/57.2 X |
| 3,084,244 | 4/1963 | Rieppel et al. | 219/60 A |
| 3,266,700 | 8/1966 | Bauer et al. | 228/29 X |
| 3,277,567 | 10/1966 | Rieppel et al. | 228/168 |
| 3,389,846 | 6/1968 | Claffey | 228/29 |
| 3,509,303 | 4/1970 | Wesler | 219/125.11 |
| 3,748,426 | 7/1973 | Stanley | 219/60 A |
| 3,920,946 | 11/1975 | Takahashi et al. | 228/29 X |

*Primary Examiner*—Francis S. Husar
*Assistant Examiner*—Kenneth J. Ramsey
*Attorney, Agent, or Firm*—Craig and Antonelli

[57] ABSTRACT

A compact automatic pipe welding apparatus having a base member separable into three sections and having a welding unit, detecting unit and a driving unit which are distributed on the circumference of the base member at an equal distance from one another is suitable for use in welding work in limited space, as is the case of installation or repair of pipings in nuclear or chemical plant. For enhancing the welding precision, ring gears are provided for interlocking a plurality of clamping means for securing the base member to the pipe stably.

19 Claims, 8 Drawing Figures

AUTOMATIC PIPE WELDING APPARATUS

BACKGROUND OF THE INVENTION

The present invention relates to an automatic pipe welding apparatus and, more particularly, to an automatic pipe welding apparatus suitable for use in welding already-constructed pipings within a limited space.

Intricate arrangement of a large number of pipes of different diameters in nuclear power plants and chemical plants arouses a demand for a compact pipe welding apparatus, because the space available for installing new pipes and/or repairing already-constructed pipes is extremely limited.

For instance, assuming here a nuclear power plant in which pipes of 200 mm dia. are installed at a pitch of 150 mm, the diameterical thickness of the base member of the welding apparatus has to be as small as about 30 mm, when the height of the welding unit is taken into consideration.

Especially, in case of a repair of already-constructed pipes, the base member of the welding apparatus has to be divided into pieces, in order that it may clamp the pipe even in a limited space, without disassembling the pipes.

The specification of U.S. Pat. No. 3,277,567 discloses a pipe welding apparatus having a split type base member. However, this split type base member requires a large space, when it is fitted around the pipe, because two halves are moved apart from each other by a distance at least equal to the diameter of the pipe. Thus, the welding apparatus having a split type base member is not suitable for use in extremely limited space.

The demand for enhanced welding precision is also increasing. It is therefore strictly required that the welding torch is rotated concentrically with the pipe. To this end, it is necessary that the base member of the welding apparatus clamps the pipe exactly concentrically with the latter, and that the welding torch goes round the periphery of the pipe in a stable manner.

The specification of U.S. Pat. No. 3,389,846 discloses three clamping means for securing the base member to the pipe. However, a highly precise centering of the base member around the pipe cannot be performed by these clamping means, because these clamping means are operated independently from each other.

Also, the specification of U.S. Pat. No. 3,266,700 suggests the use of a plurality of clamping means. A cam ring is provided on the base member for interlocking these clamping means so that they may be operated simultaneously. However, the welding apparatus is rendered complicated and large-sized, because of the presence of a hydraulic cylinder for actuating the cam ring. In addition, since the base member of this type of welding apparatus cannot be divided into sections, the apparatus cannot be applied to the repair of pipes which are fixed at both ends.

Further, in case of the repair of pipes in nuclear plants, it is highly desirable that the welding can be correctly performed without necessitating the watch by operators, in order to avoid the accident attributable to the irradiation of radioactive rays. To this end, the welding apparatus has to automatically detect the portion of the pipe to be welded and automatically locate the welding torch correctly at the detected portion to be welded.

SUMMARY OF THE INVENTION

It is therefore an object of the invention to provide a compact automatic pipe welding apparatus which can be used even in a limited space.

It is another object of the invention to provide an automatic pipe welding apparatus in which the centering of the base member around the pipe can be made easily and correctly, and the welding torch can be moved stably along the base member, so as to ensure a high precision of the welding.

It is still another object of the invention to provide an automatic pipe welding apparatus having a simple structure and adaptable for various diameters of pipes.

To these ends, according to the invention, there is provided an automatic welding apparatus having the following features.

(1) The base member of the welding apparatus is divided into a semicircular section and two quadrant sections, so as to enable the apparatus to perform the welding even in a limited space.

(2) The apparatus comprises at least three clamping members disposed on the inner periphery of the base member, and a ring gear adapted to actuate all clamping means simultaneously in an interlocking manner. This arrangement allows an easy and accurate centering of the base member around the pipe. In addition, since the ring gear is adapted to be driven by a gear assembly including a worm gear, the radial thickness of the base member is conveniently reduced, and a firm clamping of the pipe is ensured. Further, the strokes or amounts of displacement of all clamping means can be changed simultaneously, by simply changing the rotation angle of the ring gear, so as to render the welding apparatus readily adaptable for various diameters of pipes.

(3) Three carriages are provided to move in the circumferential direction along the outer periphery of the base member. The first, second and the third carriages carry, respectively, a detecting unit adapted to detect the portion on the surface of the pipe to be welded, a welding unit capable of changing the welding position in accordance with the instruction provided by the detecting unit, and a driving unit adapted to drive the carriage. These carriages are disposed at a substantially equal circumferential pitch, so that the weights of these carriages are uniformly distributed over the entire periphery of the pipe. Consequently, the circumferential driving load is made constant, so as to make the speed of travel of the welding apparatus around the pipe constant, thereby to ensure an enhanced precision of the welding.

At the same time, since the welding is performed automatically upon detecting the defective portion of the pipe automatically, without necessitating the watch by operators, the welding apparatus of the invention can suitably be used in welding work in which it is strictly required to protect human body against radioactive rays, e.g. welding of pipes in nuclear power plants.

(4) An annular recess is formed in the outer peripheral wall of the base member. Further, an annular cavity is formed along the side wall within the recess. An annular gear is provided at the bottom of the recess. Each carriage moves round the outer periphery of the base member, during which the movement of the carriage in the radial and axial directions of the pipe is limited by the cavity. Therefore, the rotation of the carriage around the base member along an orbit is rendered highly stable, so as to promise a highly precise welding.

Further objects and advantages of the invention will be apparent from a reading of the following detailed description of the preferred embodiments taken in conjunction with the accompanying drawings in which:

DESCRIPTION OF THE PREFERRED EMBODIMENTS

Figure 1:
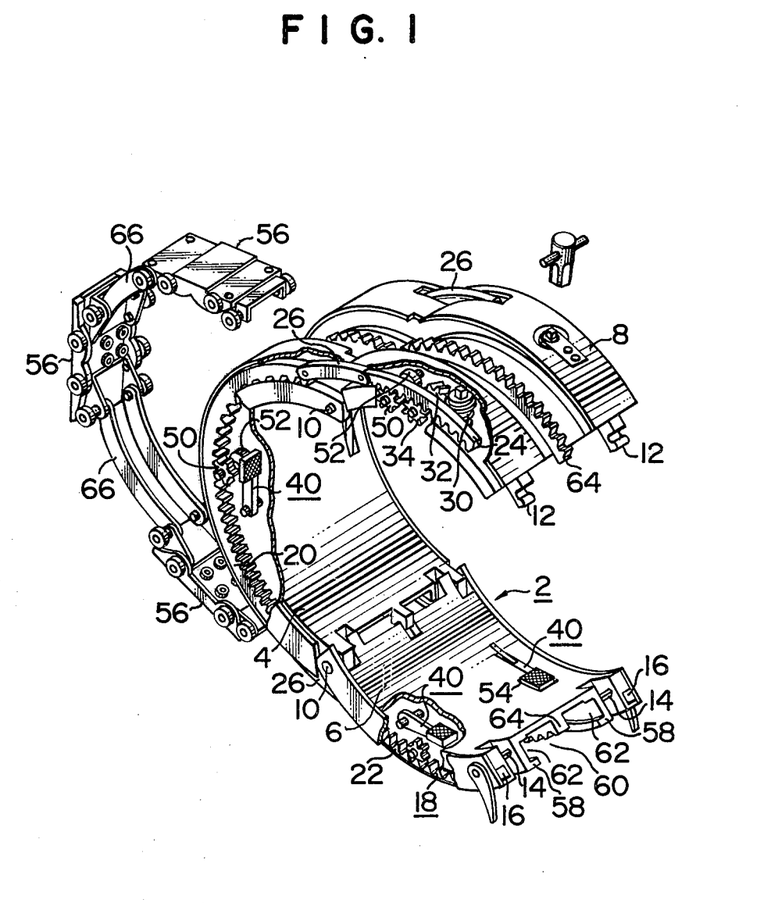
FIG. 1 is a perspective view of an embodiment of the invention, showing specifically an annular base member in exploded condition.

Referring first to FIG. 1, an annular base member 2 consists of a semicircular section 4 and two quadrant sections 6 and 8. The sections 6 and 8 are pivotally secured to respective ends of the section 4, by means of pins 10. The free ends of the sections 8 and 6 carry, respectively, hooks 12 and cooperating receptacles 14, so that they may be coupled to each other separably and lockably.

Annular grooves 16 are formed on the outer peripheral surface of the annular base member 2, at both axial end portions of the latter. A ring gear 18 is disposed in each groove 16, slidably and concentrically with the annular base member. The ring gear 18 is divided in the circumferential direction at its portions corresponding to the joints between the sections of the base member, into three segments 20, 22 and 24. The ring gear 18 is therefore opened in the same manner as the annular base member 2, when the latter is opened for securing the welding apparatus around the pipe (not shown). The segments 22, 24 of the ring gear 18 are hinged to both ends of the segment 20, through respective links 26, so that the segment 20 is never contacted by the segment 22 nor by the segment 24, when the segments 22 and 24 are swung outward to open the ring gear 18, thereby to ensure a smooth opening operation of the ring gear 18 when the annular base member 2 is opened.

Figure 2:
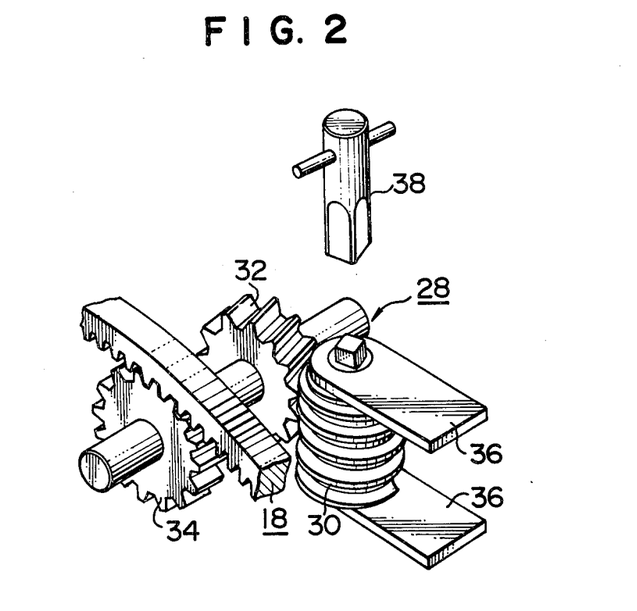
FIG. 2 is a perspective view of a gear assembly for driving a ring gear.

The ring gear 18 is adapted to be operated by a gear assembly 28 as shown in FIG. 2. The gear assembly 28 consists of a worm 30, worm gear 32 and a pinion 34. The worm 30 is secured to the annular base member 2 through a medium of two plates 36, and is adapted to be rotated by means of a handle 38. The work gear 32 is meshing with the worm 30. The pinion 34 is coaxial with the worm gear 32 and is in engagement with the ring gear 18. The arrangement is such that the ring gear is rotatively driven by the worm 30, through the worm gear 32 and the pinion 34.

As will be seen from FIG. 1, each section 4, 6, 8 of the annular base member 2 has clamping means 40 on its inner peripheral surface at both axial end portions. Each clamping means 40 consists of a rod 42 and a plate 44 fixed to one end of the rod 42. The rod 42 in turn is rockably connected to the inner peripheral surface of the annular base member 2, by means of a pin 46 secured to its other end. A plate 48 interposed between the rod 42 and the annular base member 2 plays a role of a spring.

Figure 3:
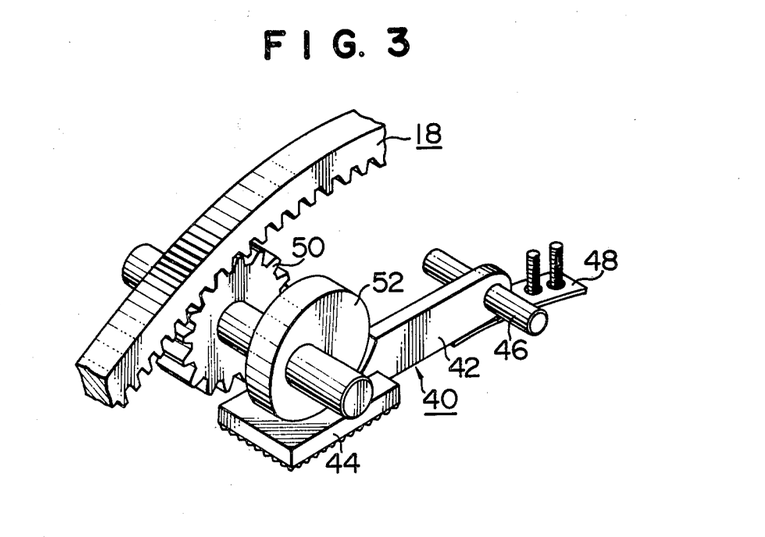
FIG. 3 is a perspective view of clamping means and their interlocking means.

A pinion 50 meshing with the ring gear 18 is disposed in the vicinity of each clamping means 40. The pinion 50 has a shaft which carries an eccentric cam 52 which is in contact with the plate 44 of the corresponding clamping means 40, through bores formed in the wall of the annular base member 2 at both axial ends of the latter.

For securing the welding apparatus to the pipe, the ring gear 18 is rotated by means of the aforementioned gear assembly 28, thereby to rotate the eccentric cams 52 through respective pinions 50, so that the plates 44 of the clamping means 40 are pressed onto the surface of the pipe. Consequently, the clamping means firmly clamps the pipe, so as to secure the annular base member 2.

Since the gear assembly 28 incorporates the worm 30, the ring gear 18 is never reversed, thereby to ensure the security of the annular base member 2 on the pipe.

Since all of the eccentric cams 52 are rotated by the ring gear 18 and the pinions 50, simultaneously and by the same angle, all clamping means 40 are displaced simultaneously and by the same distance. Thus, the ring gear 18, pinions 50 and the eccentric cam 52 in combination constitute means for interlocking all clamping means and for pressing all clamping means to the surface of the pipe.

Annular side walls 58 are formed on the outer peripheral wall of the annular base member 2 at both axial end portions of the latter. The annular side walls 58 and the annular base member 2 in combination constitute annular recesses 60. Annular cavities 62 are formed along the annular side walls 58 within the annular recess 60. An annular gear 64 is provided at the bottom of the annular recess 60.

Three carriages 56 are adapted to move along the outer periphery of the annular base member 2, being connected to one another by means of links 66. FIG. 1 shows one 56 of these carriages disengaged from a truck thereof arranged on the outer periphery of the annular base member 2.

Figure 4:
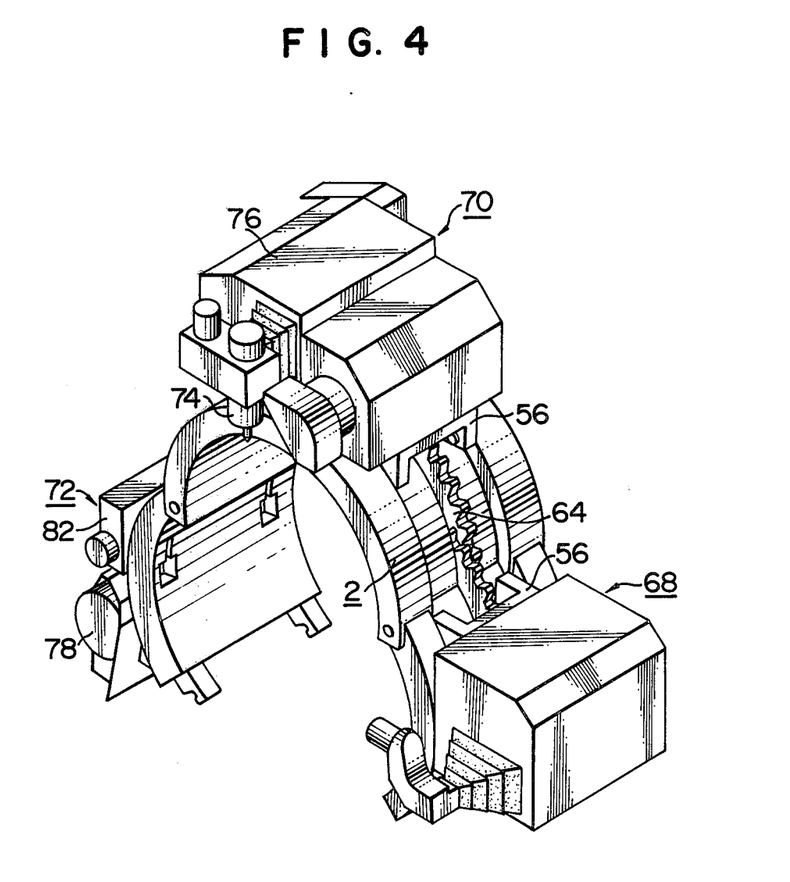
FIG. 4 is a perspective view of the embodiment of the invention, specifically showing detecting, welding and driving units mounted on respective carriages.
Figure 5:
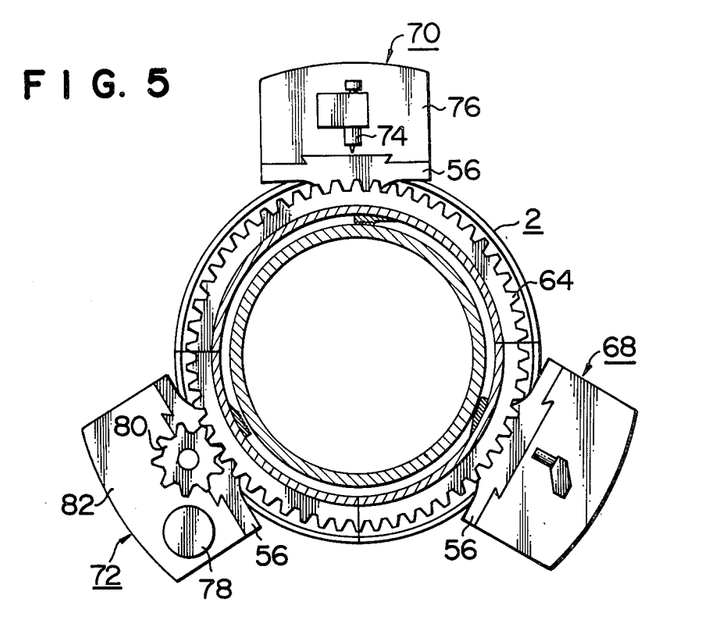
FIG. 5 is a sectional view of an apparatus in accordance with the invention secured to a pipe, taken along a plane perpendicular to the axis of the pipe.

As will be seen from FIGS. 4 and 5, three carriages 56 are connected to and spaced from one another by an equal distance.

The three carriages 56 carry, respectively, a detecting unit 68, welding unit 70 and a driving unit 72. The detecting unit 68 is adapted to detect the welding position on the surface of the pipe. The welding unit 70 consists of a welding torch which is driven in accordance with the instruction given by the detecting unit and a driving device 76 adapted to drive the welding torch 74. The driving unit 72 is intended for driving the carriages 56 and includes a motor 78, a pinion 80 meshing with the annular gear 64 on the annular base member 2, and a gear box 82 which accommodates a gear assembly adapted to transmit the power of the motor to the pinion 80.

Since the welding operation is performed automatically upon detecting the welding portion on the pipe surface by the detecting unit 68, there is no need for an inspection or watch by an operator, which is highly convenient in the welding work in which there is a danger of irradiation of radioactive rays, as is the case of the repair of pipings in nuclear power plant.

At the same time, since the three carriages 56 are equally spaced from one another, the total weight of the welding apparatus is conveniently distributed evenly over the entire circumference, so as to render the load torque for rotating the carriages 56 around the annular base member is rendered constant and regular. Consequently, a constant speed of the welding unit 68 going round the surface of the pipe 83 is ensured, thereby to promise an enhanced precision of the welding.

It is advantageous that the performance of the detecting unit 68, which is highly sensitive to heat, is never affected adversely by the heat of welding, because of the sufficiently large distance by which the detecting unit 68 is spaced from the welding unit 70.

Figure 6:
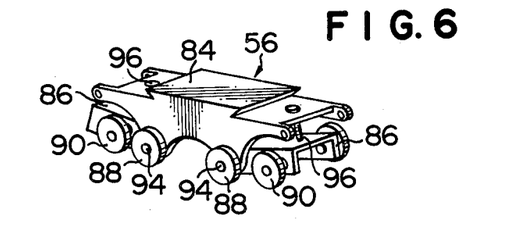
FIG. 6 is a perspective view of a carriage incorporated in the welding apparatus in accordance with the invention.

The construction of the carriage 56 will now be described with specific reference to FIGS. 6 and 8. The carriage 56 includes base plates 84, 86 and wheels 88, 90, 91 secured to the base plates 84, 86. One wheel 88 is provided at each side of the base plate 84 at two positions on the latter spaced in the direction of running of the carriage. Thus there are provided four wheels 88.

Each of the base plate 86 is supported at its one end by the base plate 84 in such a manner that the base plate 86 is rotatable around the shafts 94 of the associated pair of wheels 88. The other end of each base plate 86 is connected to the base plate 84 by means of a screw 96. The position of the base plate 86 is adjustable in relation with the base plate 84, by screwing and unscrewing the screw 96. One wheel 90 is provided at each side of the base plate 86, at each of the other ends of the same.

Figure 7:
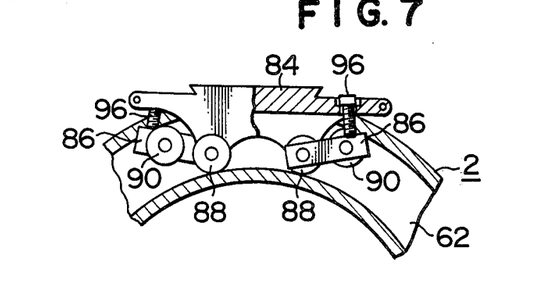
FIG. 7 is a sectional view of the carriage as shown in FIG. 6, in a state in which it is attached to an annular base member.

For securing the carriage 56 to the annular base member 2, at first the screws 96 are loosened, and, with the annular base member 2 having been opened, the carriage 56 is put into the annular recess 60 on the outer peripheral surface of the annular base member 2, in such a manner that the wheels 88, 90 are disposed in the annular cavity 62. After securing the three carriages 56 to the annular base member in the described manner, the screws 96 are tightened to bring the base plate 86 closer to the base plate 84.

The wheels 88 and 90 then contact and press the opposing upper and lower surfaces of the annular cavity 62, and roll along these surfaces. Consequently, the radial movement of the carriage 56 is limited or controlled thereby to stabilize the circumferential movement of the carriage around the annular base member 2.

Figure 8:
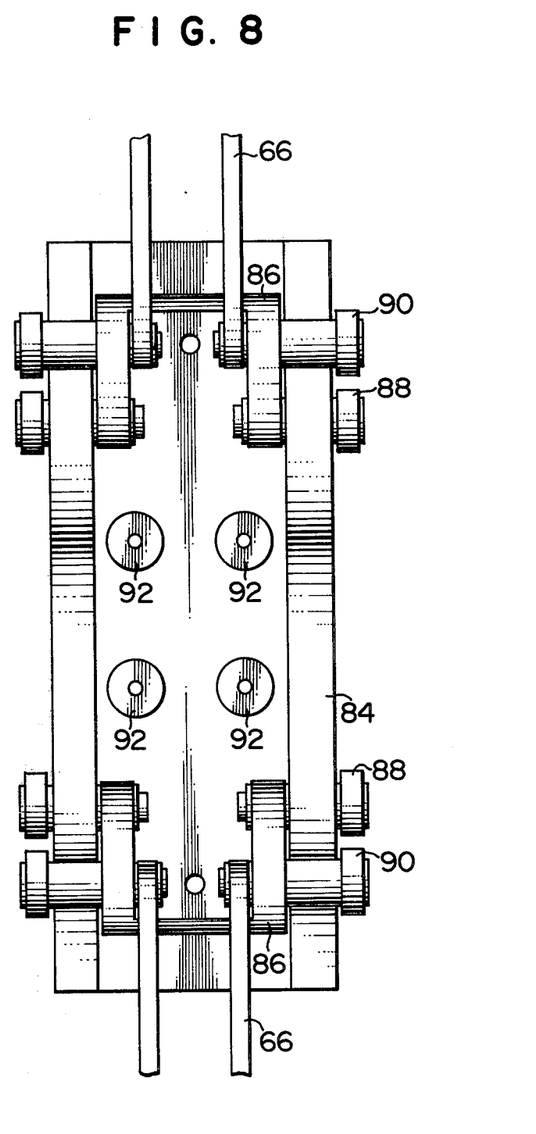
FIG. 8 is a bottom plan view of the carriage as shown in FIG. 6.

As will be seen from FIG. 8, four wheels 92 are provided at the bottom of the base plate 84, so as to embrace the annular gear 64 when the carriage 56 is secured to the annular base member 2, thereby to control or limit the axial sway of the carriage 56. Thus, the wheels 92 contribute, in combination with the wheels 88, 90, to stabilize the running of the carriage 56. The stable running of the carriage 56 of course leads to an enhanced precision of the welding.

We claim:

1. An automatic pipe welding apparatus, comprising:
    an annular base member adapted to be disposed in concentric relation to a pipe, and including a semicircular first section, a quadrant circular second section and a quadrant circular third section, said second and third sections having one respective circumferential end pivotably connected to a respective circumferential end of said first section, and their other circumferential end separably and lockably connected to one another;
    at least three circumferentially spaced clamping means disposed on the inner periphery of said annular base member and operable to clamp the pipe for fixing said annular base member with respect to the pipe;
    said annular base member having openings therein corresponding in number to the number of said clamping means and disposed at positions corresponding to those where said clamping means are located, a respective clamping means being moveable through a respective opening, said annular base member further having on the outer periphery thereof an annular concentric groove;
    interlocking means for interlocking said at least three clamping means for joint movement to secure them to the pipe;
    said interlocking means including a ring gear slidably received in said annular groove, said ring gear being divided into three sections at the locations corresponding to those where said first, second and third sections of said annular base member are connected to each other, said three sections of said ring gear being connected to each other so that said ring gear is openable as said annular base member is opened; pinions corresponding in number to the number of said clamping means with one pinion associated with each of said clamping means, said pinions being in mesh with said ring gear; and eccentric cam connected to each of said pinions, each of said cams being actuated through the connected pinion by said ring gear to urge the associated one of said clamping means against the pipe; and
    a carriage having a welding unit mounted thereon and being supported for circumferential movement on the outer periphery of said annular base member.

2. An automatic welding apparatus defined in claim 1, further comprising means mounted on said annular base member for actuating said interlocking means, said actuating means including a manually rotatable worm, a worm gear in mesh with said worm, and a second pinion connected to said worm gear and in mesh with said ring gear of said interlocking means.

3. An automatic pipe welding apparatus defined in claim 2, wherein said at least three clamping means and said annular groove on said annular base member are disposed adjacent to one axial edge of said annular base member, said apparatus further comprising:
    second at least three circumferentially spaced clamping means disposed on the inner periphery of said annular base member and adjacent to the other axial edge of said annular base member, said second clamping means being operable to clamp the pipe for fixing said annular base member with respect to the pipe;
    said annular base member having therein second openings corresponding in number to the number of said second clamping means and disposed at positions corresponding to those where said second clamping means are located, said annular base member having a second annular concentric groove on the outer periphery of said annular base member adjacent to the other axial edge thereof;

second interlocking means for interlocking said second at least three clamping means for joint movement to secure them to the pipe; and said second interlocking means including a second ring gear slidably received in said second annular groove, said second ring gear being divided into three sections at the locations corresponding to those where said first, second and third sections of said annular base member are connected to each other, said three sections of said second ring gear is openable as said annular base member is opened; third pinions corresponding in number to the number of said second clamping means with one third pinion associated with each of said second clamping means, said third pinions being in mesh with said second ring gear; and second eccentric cams with one connected to each of said second pinions, each of said second cams being actuated through the associated third pinion by said second ring gear to urge the associated one of said second clamping means against the pipe and section through the corresponding one of said second openings in said annular base member.

4. An automatic pipe welding apparatus defined in claim 3, further comprising second actuating means mounted on said annular base member for actuating said second interlocking means, said second actuating means including a second manually rotatable worm, a second worm gear in mesh with said second worm and a further pinion connected to said second worm gear and in mesh with said second ring gear of said second interlocking means.

5. An automatic pipe welding apparatus defined in claim 4, wherein there are three first-mentioned clamping means with one associated with each of the first, second and third section of said annular base member, and wherein there are three second clamping means with one associated with each of the first, second and third sections of said annular base member.

6. An automatic pipe welding apparatus defined in claim 5, further comprising a second carriage having a second detecting unit mounted thereon for detecting positions to be welded on the pipe and to produce signals representative thereof, and a third carriage having a drive unit mounted thereon, said second and third carriages being moveable circumferentially on the outer periphery of said annular base member, said first-mentioned, second and third carriages being mechanically connected to each other in substantially equi-distantly spaced relation around the outer periphery of said annular base member, said welding unit being actuated in response to the signals from said second detecting unit, and said drive unit on said third carriage driving the same to move said first-mentioned, second and third carriages circumferentially on the outer periphery of said annular base member.

7. An automatic pipe welding apparatus defined in claim 6, wherein said annular base member further includes side walls extending radially outwardly from the outer periphery of said annular base member at the axial edges thereof, respectively to define an annular recess between said side walls, each of said side walls having therein an annular cavity facing to said annular recess, said apparatus further comprising an annular concentric gear disposed on the bottom of said recess defined between said side walls, each of said carriages including:

a first base plate;

first two sets of wheels rotatably mounted on said first base plate with one set located at each of two positions spaced in the direction of the movement of said carriages, each of said two sets of wheels including two coaxial wheels spaced axially of said annular base member;

second two base plates spaced apart from one another in the direction of the movement of said carriers, said second two base plates having their opposed one ends connected to said first base plate pivotably in a plane perpendicular to the axis of said annular base member and the other ends mechanically connected to said first base plate so as to be adjustable in spaces between said the other ends and said first plate;

second two sets of wheels with one set associated with each of said second two plates, each of said second two sets of wheels including two coaxial wheels rotatably mounted on said the other end of the associated second plate in spaced relation axially of said annular base member; and the wheels of said first sets of wheels being in rolling engagement with the radially outer side walls of said annular cavities, and the wheels of said second sets of wheels being in rolling engagement with the radially inner side walls of said annular cavities.

8. An automatic pipe welding apparatus, comprising:

an annular base member adapted to be disposed in concentric relation to a pipe;

at least three circumferentially spaced clamping means disposed on the innery periphery of said annular base member and operable to clamp the pipe for fixing said annular base member with respect to the pipe;

interlocking means for interlocking said at least three clamping means to secure the same to the pipe; and first, second and third carriages mechanically connected to each other in substantially equidistantly spaced relation around the outer periphery of said annular base member, said three carriages being moveable circumferentially on the outer periphery of said annular base member, said first carriage having a detecting unit mounted thereon for detecting positions to be welded on the pipe and producing signals representative thereof, said second carriage having a welding unit mounted thereon, said welding unit being actuated in response to the signals from said detecting unit, said third carriage having a drive unit mounted thereon for driving said third carriage to move said first, second and third carriages circumferentially on the outer periphery of said annular base member.

9. An automatic pipe welding apparatus, comprising:

an annular base member adapted to be disposed in concentric relation to a pipe and including side walls extending radially outwardly from the outer periphery of said annular base member at axial edges thereof to define an annular recess between said side walls, each of said side walls having therein an annular cavity facing toward said annular recess;

an annular concentric gear disposed on the bottom of said annular recess;

at least three circumferentially spaced clamping means disposed on the inner periphery of said annular base member and operable to clamp the pipe for fixing said annular base member with respect to the pipe;

interlocking means for interlocking said at least three clamping means for joint movement to secure them to the pipe;

first, second and third carriages mechanically connected to each other in substantially equidistantly spaced relation around the outer periphery of said annular base member, said carriages being moveable circumferentially on the outer periphery of said annular base member, said first carriage having mounted thereon a detecting unit for detecting positions to be welded on the pipe to produce signals representative thereof, said second carriage having a welding unit mounted thereon, said welding unit being actuated in response to the signals from said detecting unit, said third carriage having mounted thereon a drive unit for driving said third carriage to move said first, second and third carriages circumferentially on the outer periphery of said annular base member, said third carriage further having a gear in mesh with said annular gear;

each of said carriages including:

a first base plate;

a first two sets of wheels rotatably mounted on said first base plate with one set disposed at each of two positions spaced in the direction of the movement of said carriages at the bottom of said first base plate, each of said first two sets of wheels including two wheels with one disposed at each side of said first base plate;

a second two base plates having their one end pivotably connected to said first base plate at the locations where said first two sets of wheels are mounted on said first base plate and the other ends mechanically connected to said first base plate so as to be adjustable in relative positions between said first base plate and said second base plates;

a second two sets of wheels with one set rotatably mounted on each of said second base plates, each of said second sets of wheels including two wheels with one disposed at each side of the other ed of the associated second base plate; and the wheels of said first and second sets of wheels being moveable in said annular cavities in said side walls while the wheels of said first sets of wheels are urged against the radially inner side walls of said cavities and the wheels of said second sets of wheels are urged against the radially outer side walls of said cavities.

10. An automatic pipe welding apparatus, comprising:

an annular base member adapted to be disposed in concentric relation to a pipe, and including a semicircular first section, a quadrant circular second section and a quadrant circular third section, said second and third sections having one respective circumferential end pivotably connected to a respective circumferential end of said first section, and their other respective circumferential ends separably and lockably connected to another;

three clamping means with one associated with each of said first, second and third sections of said annular base member and disposed on the inner surface of the associated section, said clamping means being operable to clamp the pipe for fixing said annular base member with respect to the pipe;

interlocking means for interlocking said clamping means for joint movement to secure the same to the pipe; and first, second and third carriages being mechanically connected to each other in substantially equi-distantly spaced relation around the outer periphery of said annular base member, said carriages being moveable circumferentially on the outer periphery of said annular base member, said first carriage having mounted thereon a detecting unit for detecting positions to be welded on the pipe and for producing signals representative thereof, said second carriage having a welding unit mounted thereon, said welding unit being actuated in response to the signals from said detecting unit, and said third carriage having mounted thereon a drive unit for driving said third carriage to move said first, second and third carriages circumferentially on the outer periphery of said annular base member.

11. An automatic pipe welding apparatus, comprising:

an annular base member adapted to be disposed in concentric relation to a pipe;

at least three circumferentially spaced clamping means disposed on the inner periphery of said annular base member and operable to clamp the pipe for fixing said annular base member with respect to the pipe;

said annular base member having openings therein corresponding in number to the number of said clamping means and disposed at positions corresponding to those where said clamping means are located, each clamping means being extendable through a corresponding opening, and said annular base member further having on the outer periphery thereof an annular concentric groove;

a ring gear slidably received in said annular groove;

pinions corresponding in number to the number of said clamping means with one pinion associated with each of said clamping means, said pinions being in mesh with said ring gear;

eccentric cams with one being connected to each of said pinions, each of said cams being actuated through the associated pinion by said ring gear to urge the associated one of said clamping means against the pipe; and first, second and third carriages mechanically connected to each other in substantially equidistantly spaced relation around the outer periphery of said annular base member, said carriages being movable circumferentially on the outer periphery of said annular base member, said first carriage having a detecting unit mounted thereon for detecting positions to be welded on the pipe and for producing signals representative thereof, said second carriage having a welding unit mounted thereon, said welding unit being actuated in response to the signals from said detecting unit, and said third carriage having a drive unit mounted thereon for driving said third carriage to move said first, second and third carriages circumferentially on the outer periphery of said annular base member.

12. An automatic pipe welding apparatus, comprising:

an annular base member adapted to be disposed in concentric relation to a pipe, and including a semicircular first section, quadrant circular second section and quadrant circular third section, said second and third sections having one respective circumferential end pivotably connected to a respective circumferential end of said first section, and their other respective circumferential ends separably and lockably connected to one another;

three clamping means with one associated with each of said first, second and third sections of said annular base member and disposed on the inner surface of the associated section, said clamping means being operable to clamp the pipe for fixing said annular base member with respect to the pipe;

said annular base member having openings therein corresponding in number to the number of said clamping means and disposed at positions corresponding to those where said clamping means are located, each clamping means being extendable through a corresponding opening, said annular base member further having on the outer periphery thereof an annular concentric groove;

a ring gear slidably received in said annular groove and divided into three sections at the locations corresponding to those where said first, second and third sections of said annular base member are connected to each other, said three sections of said ring gear being connected to each other so that said ring gear is openable as said annular base member is opened;

pinions in mesh with said ring gear with one pinion associated with each of said clamping means;

eccentric cams with one connected to each of said pinions, each of said cams being actuated through the associated pinion by said ring gear to urge the associated one of said clamping means against the pipe; and first, second and third carriages mechanically connected to each other in substantially equidistantly spaced relation around the outer periphery of said annular base member, said carriages being moveable circumferentially on the outer periphery of said annular base member, said first carriage having a detecting unit mounted thereon for detecting positions to be welded on the pipe and for producing signals representative thereof, said second carriage having a welding unit mounted thereon, said welding unit being actuated in response to the signals from said detecting unit, and said third carriage having a driving unit mounted thereon for driving said third carriage to move said first, second and third carriages circumferentially on the outer periphery of said annular base member.

13. An automatic pipe welding apparatus, comprising:

an annular base member adapted to be disposed in concentric relation to a pipe, and including a semicircular first section, a quadrant second section and a quadrant third section, said second and third sections having one respective circumferential end pivotably connected to a respective circumferential end of said first section, and their other respective circumferential ends separably and lockably connected to one another;

three clamping means with one associated with each of said first, second and third sections of said annular base member and disposed on the inner surface of the associated section, said clamping means being operable to clamp the pipe for fixing said annular base member with respect to the pipe;

said annular base member having side walls extending radially outwardly from the outer periphery of said annular base member at the axial edges thereof to define an annular recess between said side walls, each of said side walls having therein an annular cavity facing to said annular recess, said annular base member further having therein openings with one associated with each of said clamping means and located at each of positions corresponding to those where said clamping means are located, and an annular concentric groove on the outer periphery of said annular base member;

each of said clamping means including a rod having one end thereof pivotably connected to said annular base member and a plate connected to the other end of said rod, said plate being moveable through the associated one of said openings in said annular base member toward and away from the pipe;

a ring gear slidably received in said annular concentric groove and divided into three sections at the locations corresponding to those where said first, second and third sections of said annular base member are connected to each other, said three sections of said ring gear being connected to each other so that said ring gear is openable as said annular base member is opened;

a gear assembly mounted on said annular base member for driving said ring gear, and including a manually rotatable worm, a worm gear in mesh with said worm and a first pinion connected to said worm gear and in mesh with said ring gear;

means mounted on said annular base member for actuating said clamping means, and including second pinions with one associated with each of said clamping means, and second pinions being in mesh with said ring gear, and eccentric cams, one cam being connected to each of said second pinions and engaged with the associated one of said plates of said clamping means, in which, upon rotation of said worm, the rotation of said ring gear rotates said second pinions to cause the respective cams to urge the respective plates of said clamping means against the pipe;

an annular concentric gear on the bottom of said annular recess defined between said side walls of said annular base member;

first, second and third carriages mechanically connected to each other in substantially equi-distantly spaced relation around the outer periphery of said annular base member, said carriages being moveable circumferentially on the outer periphery of said annular base member, said first carriage having a detecting unit mounted thereon for detecting positions to be welded on the pipe and for producing signals representative thereof, said second carriage having a welding unit mounted thereon, said welding unit being actuated in response to the signals from said detecting unit, said third carriage having a drive unit mounted thereon for driving said third carriage to move said first, second and third carriages circumferentially on the outer periphery of said annular base member, said drive unit having a gear in mesh with said annular concentric gear on the bottom of said annular recess of said annular base member; and each of said carriages including:

a first base plate;

first two sets of wheels rotatably mounted on said first base plate with one set disposed at each of two positions spaced in the direction of the movement of said carriages at the bottom of said first base plate, each of said first two sets of wheels including two wheels with one disposed on each side of said first base plate;

second two base plates having their respective one ends pivotably connected to said first base plate at the positions where said first two sets of wheels are mounted on said first base plate and the respective other ends mechanically connected to said first base plate so as to be adjustable in relative positions between said first base plate and said second base plates;

second two sets of wheels with one set rotatably mounted on each of said second base plates, each of said second two sets of wheels including two wheels with one disposed at each side of the other end of the associated second base plate; and the wheels of said first and second sets of wheels being moveable within said annular cavities while the wheels of said first sets of wheels are urged against the radially inner walls of said annular cavities and the wheels of said second sets of wheels are urged against the radially outer walls of said annular cavities.

14. An automatic welding apparatus defined in claim 8, wherein said at least three clamping means are disposed adjacent to one axial edge of said annular base member, said apparatus further comprising:

second at least three circumferentially spaced clamping means disposed on the inner periphery of said annular base member and adjacent to the other axial edge of said annular base member, said second clamping means being operable to clamp the pipe for fixing said annular base member with respect to the pipe; and second interlocking means for interlocking said second at least three clamping means for joint movement to secure the same to the pipe.

15. An automatic pipe welding apparatus defined in claim 9, wherein said at least three clamping means are disposed adjacent to one axial edge of said annular base member, said apparatus further comprising:

a second at least three circumferentially spaced clamping means disposed on the inner periphery of said annular base member and adjacent to the other axial edge of said annular base member, said second clamping means being operable to clamp the pipe for fixing said annular base member with respect to the pipe; and a second interlocking means for interlocking said second at least three clamping means for joint movement to secure the same to the pipe.

16. An automatic pipe welding apparatus defined in claim 10, wherein each of said three clamping means is disposed adjacent to one axial edge of the associated one of said sections of said annular base member, said apparatus further comprising:

a second three circumferentially spaced clamping means with one associated with each of said first, second and third sections of said annular base member and disposed on the inner surface of the associated section adjacent to the other axial edge thereof, said second clamping means being operable to clamp the pipe for fixing said annular base member with respect to the pipe; and a second interlocking means for interlocking said second three clamping means for joint movement to secure the same to the pipe.

17. An automatic pipe welding apparatus defined in claim 11, wherein said at least three clamping means and said annular groove are disposed adjacent to one axial edge of said annular base member, said apparatus further comprising:

second at least three circumferentially spaced clamping means disposed on the inner periphery of said annular base member and adjacent to the other axial edge of said annular base member, said second clamping means being operable to clamp the pipe for fixing said annular base member with respect to the pipe;

said annular base member having therein second openings corresponding in number to the number of said second clamping means and disposed at positions corresponding to those where said second clamping means are located, said annular base member further having a second annular concentric groove on the outer periphery of said annular base member adjacent to the other axial edge thereof;

a second ring gear slidably received in said second annular groove;

second pinions corresponding in number to the number of said second clamping means with one second pinion associated with each of said second clamping means, said second pinions being in mesh with said second ring gear; and second eccentric cams with one connected to each of said second pinions, each of said second cams being actuated through the associated second pinion by said second ring gear to urge the associated one of said second clamping means against the pipe through the corresponding one of said second openings in said annular base member.

18. An automatic pipe welding apparatus defined in claim 12, wherein each of said three clamping means is disposed adjacent to one axial edge of the associated one of said first, second and third sections of said annular base member, and said annular groove is also disposed adjacent to one axial edge of said annular base member, said apparatus further comprising:

second three circumferentially spaced clamping means with one associated with each of said first, second and third sections of said annular base member and disposed on the inner surface of the associated section adjacent to the other axial edge thereof, said second clamping means being operable to clamp the pipe for fixing said annular base member with respect to the pipe;

said annular base member having therein second openings corresponding in number to the number of said second clamping means and disposed at positions corresponding to those where said second clamping means are located, said annular base member further having a second annular concentric groove on the outer periphery of said annular base member adjacent to the other axial edge thereof;

a second ring gear slidably received in said second annular groove and divided into three sections at the locations corresponding to those where said first, second and third sections of said annular base member are connected to each other, said three sections of said second ring gear being connected to each other so that said second ring gear is openable as said annular base member is opened;

second pinions with one associated with each of said second three clamping means, said second pinions being in mesh with said second ring gear; and second eccentric cams with one connected to each of said second pinions, each of said second cams being actuated through the associated second pinion by said second ring gear to urge the associated one of said clamping means against the pipe through the corresponding one of said openings in said annular base member.

19. An automatic pipe welding apparatus defined in claim 13, wherein each of said three clamping means is disposed adjacent to one axial edge of the associated one of said first, second and third sections of said annular base member, and said annular groove is also disposed adjacent to one axial edge of said annular base member, said apparatus further comprising:

second three circumferentially spaced clamping means with one associated with each of said first, second and third sections of said annular base member and disposed on the inner surface of the associated section adjacent to the other axial edge thereof, said second clamping means being operable to clamp the pipe for fixing said annular base member with respect to the pipe;

said annular base member having therein second openings with one associated with each of said clamping means and disposed at each of positions corresponding to those where said second clamping means are located, said annular base member further having a second annular concentric groove on the outer periphery of said annular base member adjacent to the other axial edge thereof;

a second ring gear slidably received in said second annular groove and divided into three sections at the locations corresponding to those where said first, second and third sections of said annular base member are connected to each other, said three sections of said second ring gear being connected to each other so that said second ring gear is openable as said annular base member is opened;

a second gear assembly mounted on said annular base member for driving said second ring gear, and including a second manually rotatable worm, a second worm gear in mesh with said second worm and a third pinion connected to said second worm gear and in mesh with said second ring gear;

each of said second clamping means including a second rod having one end thereof pivotably connected to said annular base member and a second plate connected to the other end of said second rod, said second plate being moveable through the associated one of said second openings in said annular base member toward and away from the pipe; and second actuating means mounted on said annular base member for actuating said second clamping means and including fourth pinions with one associated with each of said second clamping means, said fourth pinions being in mesh with said second ring gear, and second eccentric cams with one connected to each of said fourth pinions and engaged with the associated one of said second plates, in which upon rotation of said second worm the rotation of said second ring gear rotates said fourth pinions to cause the respective second cams to urge the respective second plates against the pipe.

* * * * *